United States Patent [19]
Moore et al.

[11] Patent Number: 5,812,370
[45] Date of Patent: Sep. 22, 1998

[54] MEDIA EJECT MECHANISM

[75] Inventors: Andrew W. Moore; Steven D. Gluskoter, both of Austin, Tex.

[73] Assignee: Dell USA, L.P., Round Rock, Tex.

[21] Appl. No.: 663,830

[22] Filed: Jun. 14, 1996

[51] Int. Cl.⁶ .............................. H05K 7/14; G06F 1/16
[52] U.S. Cl. ...................... 361/684; 361/740; 439/159
[58] Field of Search ........................ 361/683, 684, 361/685, 686, 724–727, 732, 740, 754, 759, 798, 801; 439/152–160, 928, 928.1; 364/708.1; 360/137, 137 D, 99.02, 99.06; G06F 1/16

[56] References Cited

U.S. PATENT DOCUMENTS

| | | | |
|---|---|---|---|
| 4,887,188 | 12/1989 | Yoshida et al. | 361/684 |
| 5,220,520 | 6/1993 | Kessoku | 364/708.1 |
| 5,305,180 | 4/1994 | Mitchell et al. | 361/685 |
| 5,319,519 | 6/1994 | Sheppard et al. | 361/685 |
| 5,386,407 | 1/1995 | Park | 369/77.2 |
| 5,422,785 | 6/1995 | Garrett et al. | 361/684 |
| 5,440,448 | 8/1995 | Stewart et al. | 361/684 |
| 5,507,658 | 4/1996 | Ho | 439/159 |
| 5,558,527 | 9/1996 | Lin | 439/155 |
| 5,587,854 | 12/1996 | Sato et al. | 360/97.01 |

FOREIGN PATENT DOCUMENTS 0 310 273 B1   11/1994   European Pat. Off. .

*Primary Examiner*—Lynn D. Feild
*Attorney, Agent, or Firm*—Skjerven, Morrill, MacPherson, Franklin & Friel; Stephen A. Terrile

[57] ABSTRACT

A media eject mechanism is disclosed which includes an L shaped eject member having an ejection spring portion and a lock spring portion and a media housing which engages the lock spring portion such that when the lock spring portion is disengaged with the media housing the ejection spring portion causes the media to be ejected. Such a mechanism advantageously provides media eject functionality using a small number of discrete parts.

29 Claims, 8 Drawing Sheets

MEDIA EJECT MECHANISM

BACKGROUND OF THE INVENTION

1. Field of the Invention

This invention relates in general to computer systems and, more particularly, to display control apparatus for computer systems such as personal computer systems.

2. Description of the Related Art

Personal computer systems in general and IBM compatible personal computer systems in particular have attained widespread use. These personal computer systems now provide computing power to many segments of today's modern society. A personal computer system can usually be defined as a desktop, floor-standing, or portable microcomputer that includes a system unit having a system processor with associated volatile and non-volatile memory, a display monitor, a keyboard, a hard disk storage device or other type of storage media such as a floppy disk drive or a compact disk read only memory (CD ROM) drive. One of the distinguishing characteristics of these systems is the use of a system board or motherboard to electrically connect these components together. These personal computer systems are information handling systems which are designed primarily to give independent computing power to a single user or group of users and are inexpensively priced for purchase by individuals or small businesses.

Portable computers are often referred to as laptop, notebook or subnotebook computers. These computers typically incorporate a flat panel display such as a liquid crystal display (LCD) or other relatively small display. One problem associated with computer systems in general and portable computer systems in particular is how to effectively eject a module such as a media device such as a CD ROM drive or a floppy disk drive from the computer system. More specifically, it is desirable to have a mechanism for locking exchangeable components in place and for ejecting those components. Reliability, space conservation, cost and ergonomics are all factors which are taken into consideration when designing these components. It is desirable to provide a media eject mechanism which effectively locks exchangeable components while requiring a small number of discrete parts.

SUMMARY OF THE INVENTION

It has been discovered that a media eject mechanism which includes an L shaped eject member having an ejection spring portion and a lock spring portion and a media housing which engages the lock spring portion such that when the lock spring portion is disengaged with the media housing the ejection spring portion causes the media to be ejected advantageously provides a media eject system having a small number of discrete parts.

More specifically, in a preferred embodiment, the invention relates to an eject system for use with a system having a chassis defining a bay. The eject system includes an eject mechanism and a housing. The eject mechanism includes an eject spring and a lock spring both of which have actions. The eject spring and the lock spring are coupled to the chassis. The lock spring includes a lock tab extending from the lock spring. The action of the eject spring is generally perpendicular to the action of the lock spring. The housing defines a locking recess. The lock tab mates with the locking recess when the housing is inserted within the bay.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION OF THE PREFERRED EMBODIMENTS

The following sets forth a detailed description of the best contemplated mode for carrying out the invention. The description is intended to be illustrative of the invention and should not be taken to be limiting.

Figure 1:
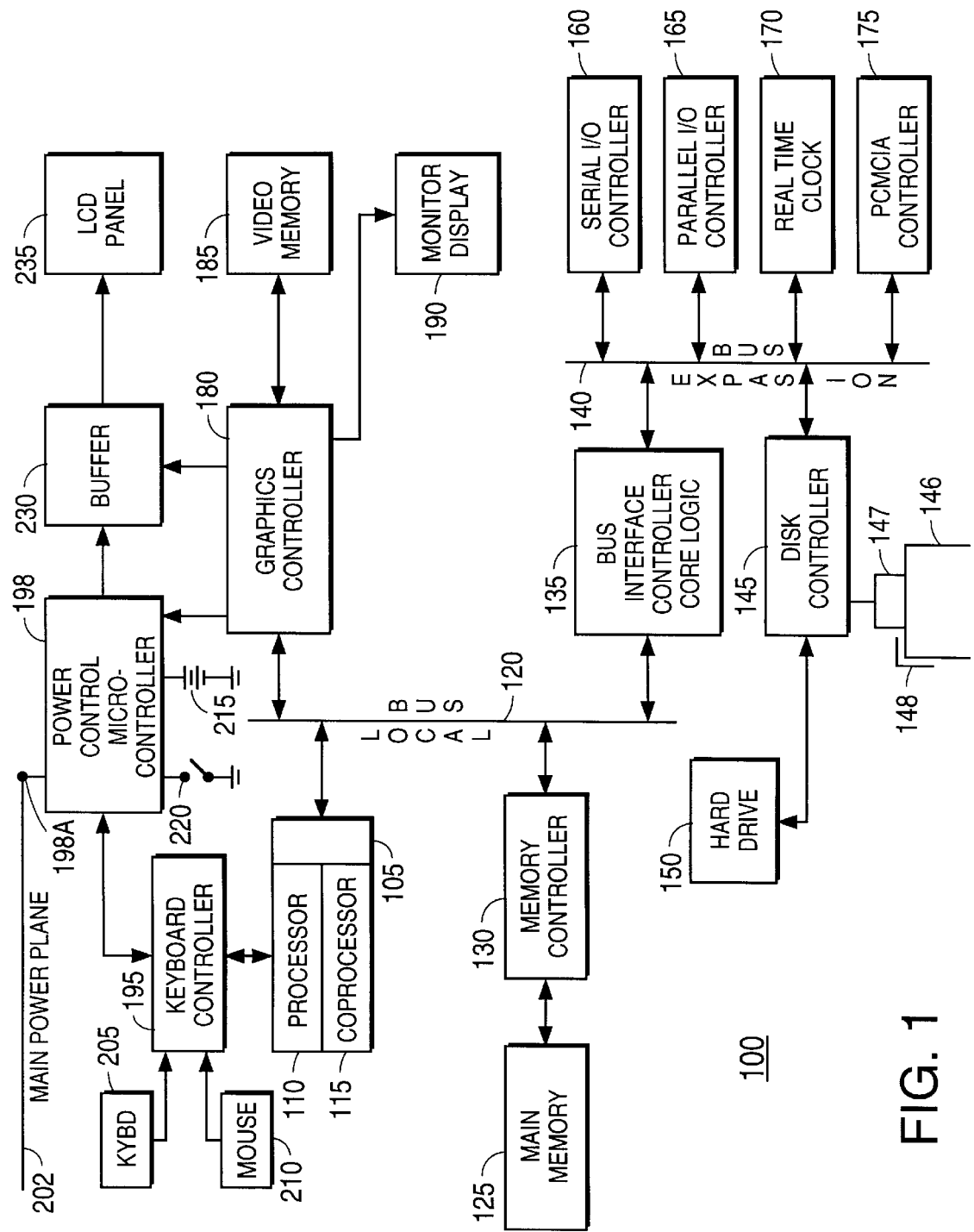
FIG. 1 is a block diagram of a computer system employing an eject system in accordance with an embodiment of the present invention.

FIG. 1 is a block diagram of a computer 100 which employs a media eject mechanism in accordance with the present invention. Computer 100 includes a microprocessor 105 having a processor 110 for handling integer operations and a coprocessor 115 for handling floating point operations. Microprocessor 105 is coupled to a local bus 120. A main memory 125 of dynamic random access memory (DRAM) modules is coupled to local bus 120 by a memory controller 130.

A bus interface controller 135 couples local bus 120 to an expansion bus 140. Expansion bus 140 is an industry standard architecture (ISA) bus or other bus architecture, if desired. A disk controller 145 couples a hard drive 150 to expansion bus 140 as shown. Disk controller 145 also couples expansion bus 140 to media bay 146 via connector 147. Media bay 146 mechanically receives and ejects various media modules via media eject mechanism 148. Other devices such as serial I/O controller 160, parallel I/O controller 165, real time clock 170 and PC card controller 175 are also coupled to expansion bus 140.

A graphics controller 180 is coupled to local bus 120. Graphics controller 180 is coupled to a video memory 185 which stores information to be displayed. Graphics controller 180 can also be optionally coupled to a standalone monitor display 190 as shown in FIG. 1.

A keyboard controller 195 is coupled between microprocessor 105 and a power control microcontroller 198. Keyboard controller 195 is a microcontroller which interfaces input devices such as keyboard 205 and pointing device 210 to microprocessor 105. Microcontroller 198 is coupled to a battery 215 to control the distribution of energy from the battery to the many subsystems and components of computer 100. Power control microcontroller 198 is coupled at output 198A to the main power plane 202 which supplies power to many of the components of the computer. Moreover, microcontroller 198 monitors the charge level of battery 215 to determine when to charge and when not to charge battery 215. Microcontroller 198 is coupled to a main power switch 220 which the user actuates to turn the computer on and off.

Graphics controller 180 produces control signals which are intercepted by microcontroller 198 and buffer 230 before being applied to LCD panel display 235. Buffer 230 is coupled between graphics controller 180 and LCD panel display 235 to provide a signal path therebetween, such signal path being controlled under the direction of microcontroller 198. Buffer 230 effectively acts as a gate between graphics controller 180 and LCD panel.

Figure 2A:
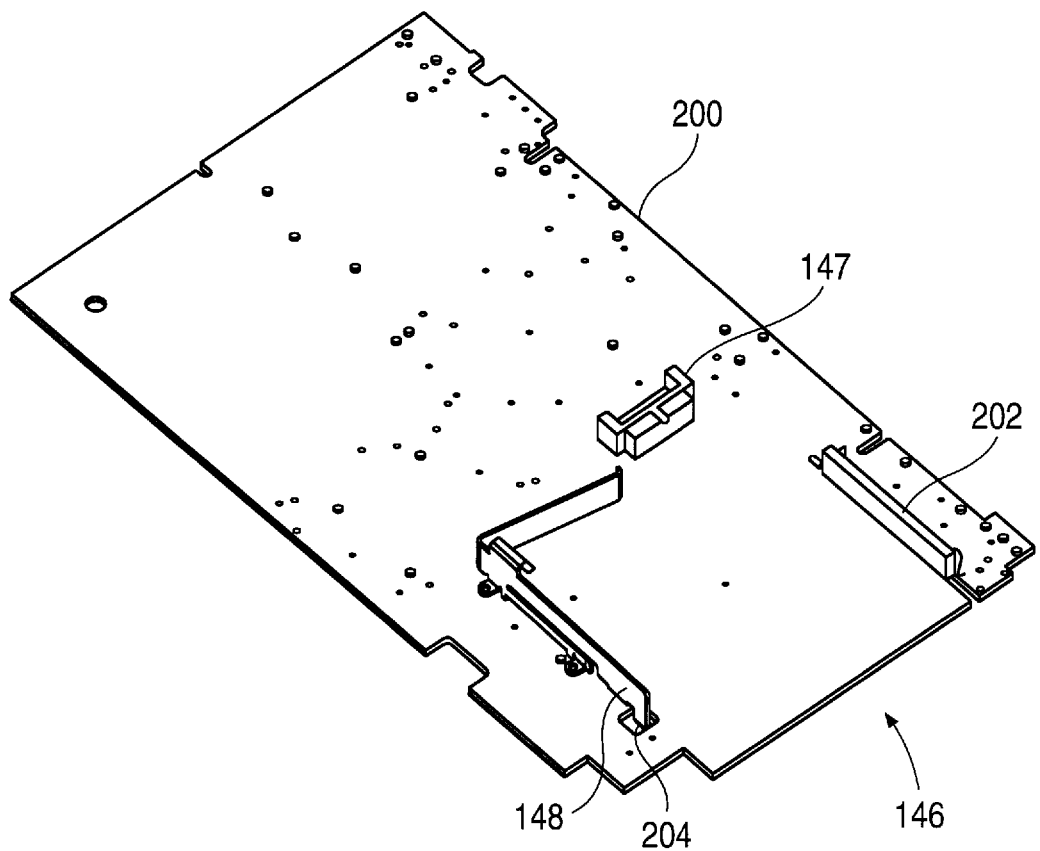
FIGS. 2A and 2B (generally referred to as FIG. 2) are perspective views showing the mechanical interconnection of a media receptacle, a media eject mechanism and a system board of the computer system of FIG. 1.
Figure 2B:
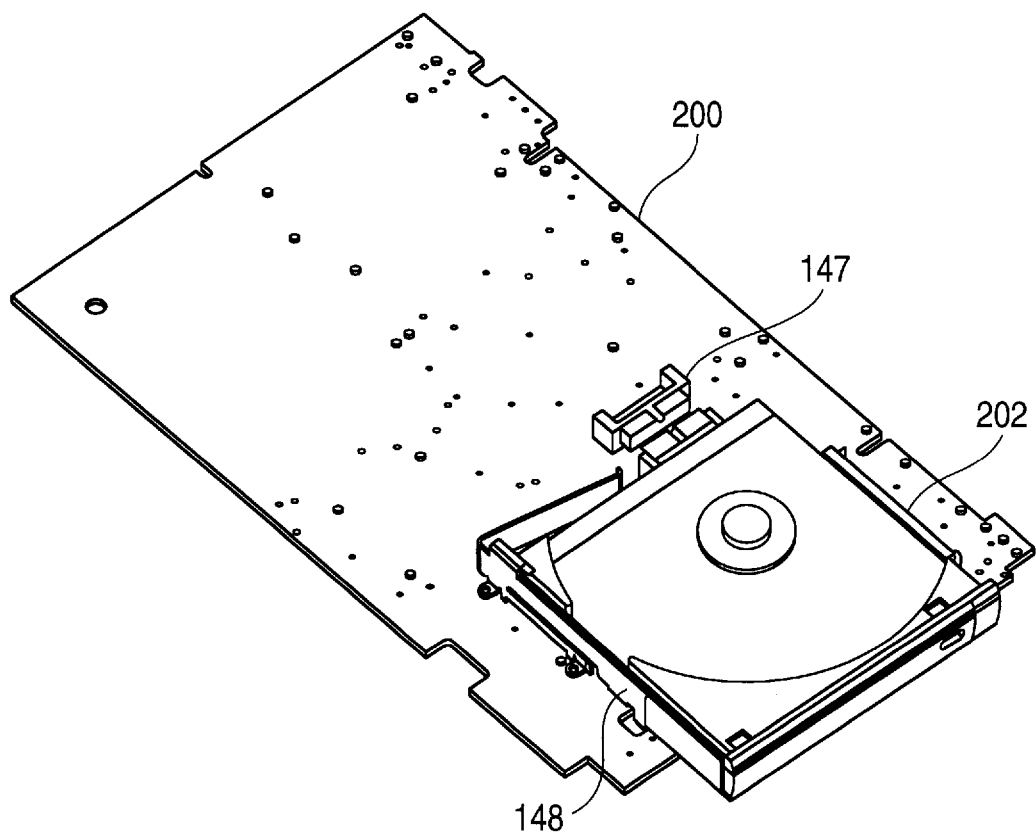

FIG. 2A shows the mechanical interconnection of media eject mechanism 148 and system board 200 which combine with the computer system chassis (not shown) to define media bay 146. More specifically, media eject mechanism 148 and connector 147 are coupled to system board 200. Side wall 202 is also coupled to system board 200. Media eject mechanism 148, side wall 202 and system board 200 combine to define portions of media bay 146. Media ejection mechanism 148 extends through system board 200 to couple to release button 204.

Figure 3A:
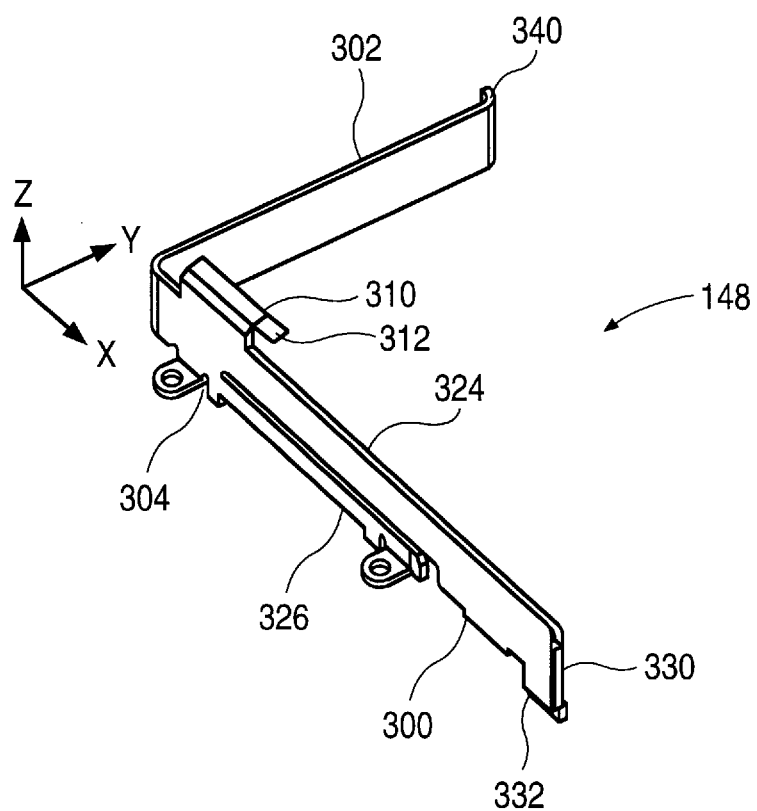
FIG. 3A is a perspective view of a media eject mechanism of FIG. 1.
Figure 3B:
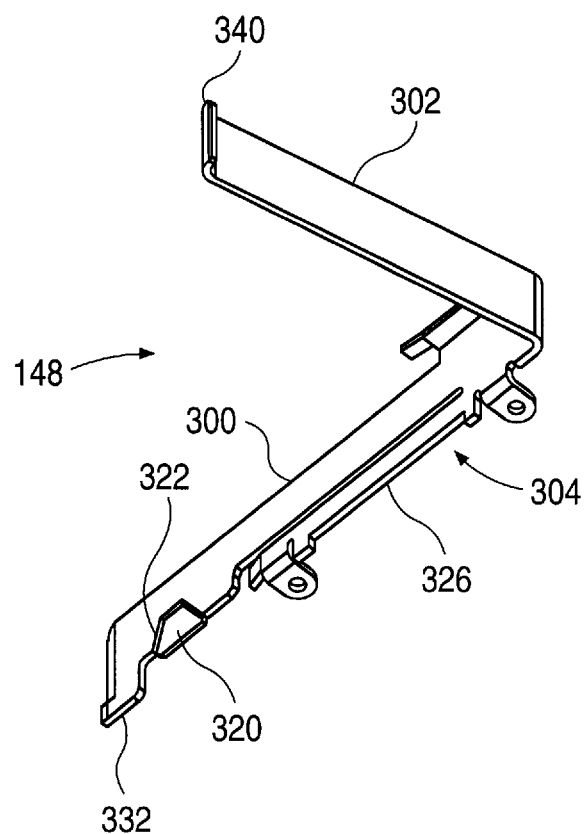
FIG. 3B is another perspective view of a media eject mechanism of FIG. 1.
Figure 3C:
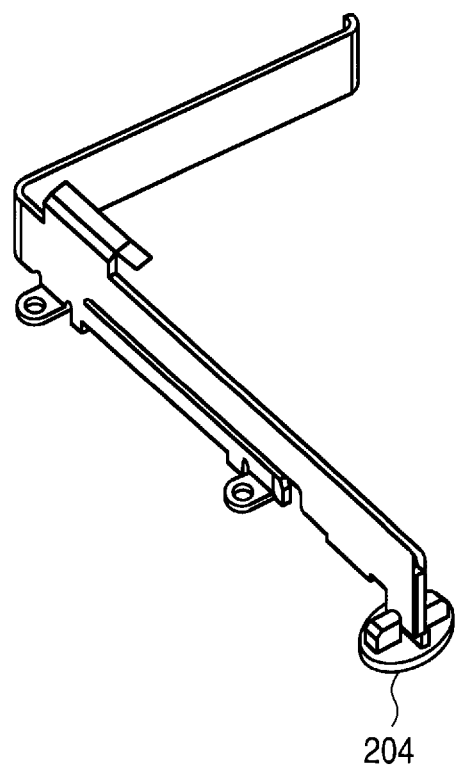
FIG. 3C is a perspective view showing the interconnection of a media eject mechanism and a release button of the media eject system of FIG. 2.

FIG. 3A–3C shows perspective views of media eject mechanism 148. More specifically, media eject mechanism 148 is a generally L-shaped member which includes lock spring 300 and eject spring 302, both of which are coupled to mount portion 304.

Media eject mechanism 148 also includes retainer tab 310 which is coupled to and extends perpendicularly from mount portion 304. Retainer tab 310 includes leading angled portion 312 which is angled away from mount portion 304.

Lock spring 300 includes lock tab 320 which extends perpendicularly therefrom. Lock tab 320 includes angled leading edge 322. Lock spring 300 is a beam spring with a maximum deflect force of two to three pounds. The maximum deflected force of lock spring 300 is tunable by adjusting the ratio of the width of spring arm 324 to the width of tensioning portion 326 of mount portion 304. Lock spring 300 also includes leading edge portion 330, which is angled away from lock spring 300, and flange 332 which is coupled between leading edge portion 330 and spring arm 324. Flange 332 extends from spring arm 324 to allow release button 204 (See FIG. 3C) to couple to media eject mechanism 148 while extending through system board 200.

Eject spring 302 includes angled end portion 340 so that eject spring 302 does not catch any part of media module housing 400 (See FIG. 4) when media module housing 406 is inserted into media bay 146. The strength of eject spring 302 is designed to be more than the friction exerted between the pins of connector 147 and the connector of the media module while not being so great as to eject media module with an undue amount of force, i.e., enough force to completely eject the module in any orientation. For example, in a preferred embodiment, the force of eject spring 302 is six pounds while the force of the friction exerted between the connectors is five pounds.

Figure 4:
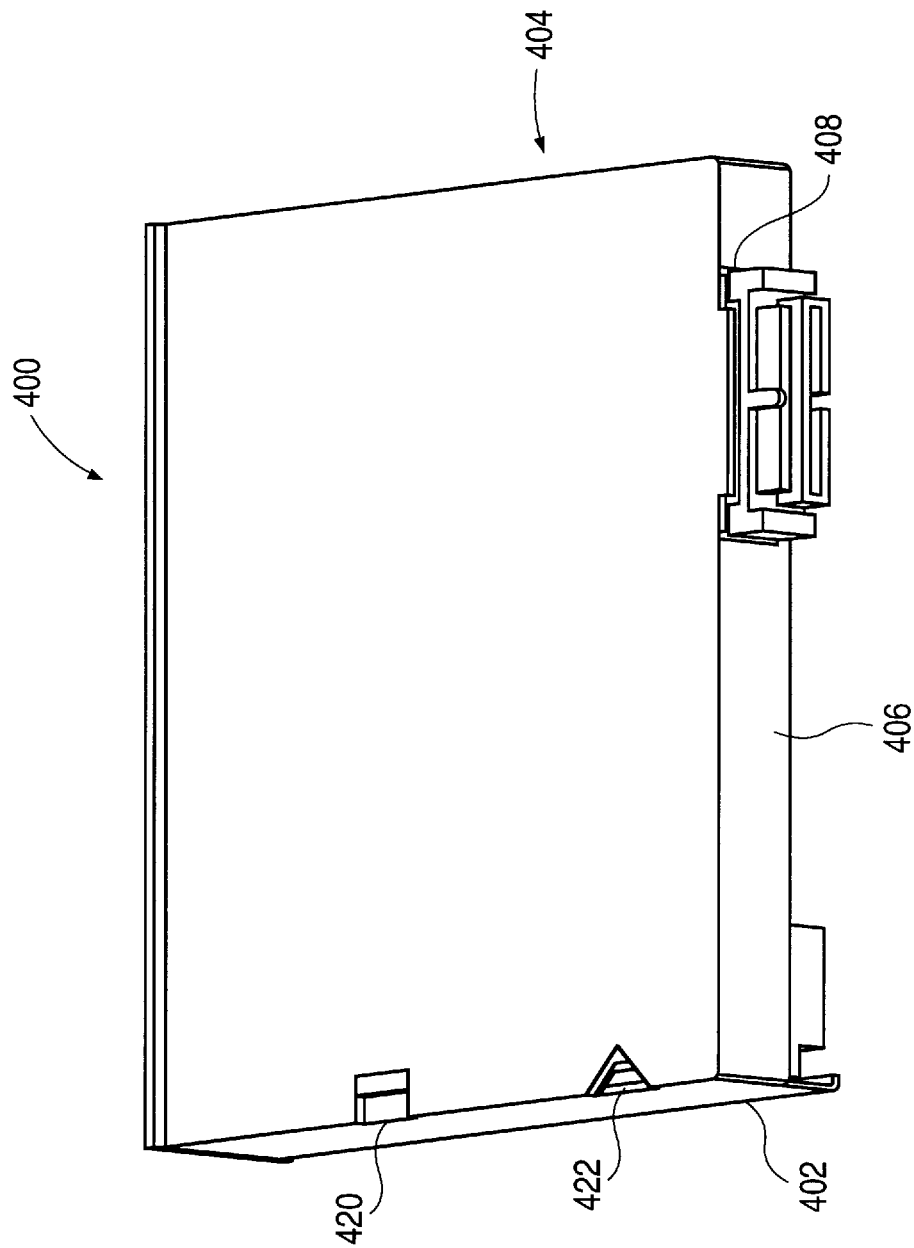
FIG. 4 is a perspective view of a media module housing of the media eject mechanism of FIG. 1.

FIG. 4 shows a perspective view of the media module housing 400 which may house any of a variety of media modules such as CD ROM drives or floppy disk drives. Media eject mechanism 148 and media module housing 400 combine to provide a media eject system. More specifically, media module housing is sized to hold various storage media such as CD ROM drives or disk drives while providing a standard interface with media bay 146. These storage media are well known in the art. Media module housing 400 includes side walls 402, 404 which are coupled via back wall 406. Back wall 406 defines conduit 408 though which the connector of the storage media extends. This conduit is design to allow the storage media connector to couple with connector 147.

Side wall 402 of media module housing 400 defines locking recess 420 as well as retention recess 422. Locking recess 420 is positioned to couple with lock tab 320 when media module housing is completely inserted into media receptacle 147. Retention recess 422 is positioned between locking recess 420 and back wall 406 to couple with lock tab 320 during insertion and removal of media module housing 400 into and out of media receptacle 147, respectively. Retention recess 422 is angled such that when mating with lock tab 320, media module housing 400 is not locked in place.

Figure 5A:
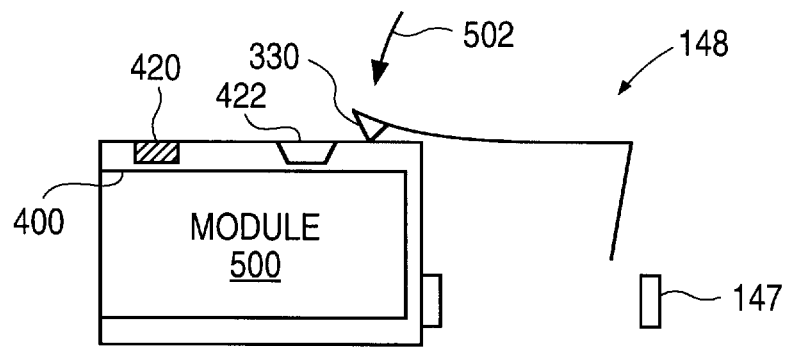
FIGS. 5A–5C are block diagrams showing the operation of the media eject mechanism of FIG. 1.
Figure 5B:
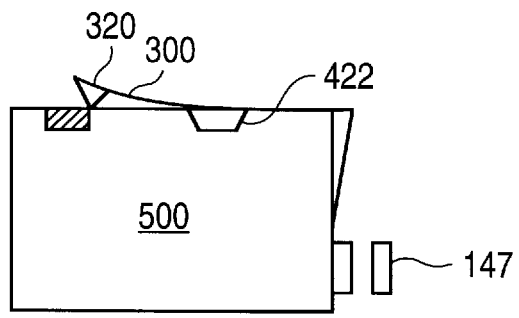
Figure 5C:
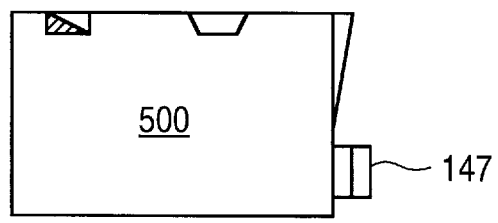

FIGS. 5A–5C show the operation of the media eject system. More specifically, when a media module 500 is inserted into media bay 146, the leading edge of media module housing 400, which is substantially located by the corner of the media housing defined by one of side walls 402, 404 and back wall 406, engages leading edge portion 330 of lock spring 300, thus pushing lock spring 300 out of the insertion path of media module 500. Leading edge portion 330 also causes media module housing 400 to be centered if it is off center when initially inserted within media bay 146. During the insertion of media module 500, lock spring 300, and more specifically the action of lock spring 300 shown by arrow 502, provides a side load on media module 500 which causes media module 500 to push against the side wall which is opposite media eject mechanism 148 thus stabilizing media module 500 during insertion.

After media module housing 400 engages leading edge portion 330, media module housing 400 then comes in contact with angled portion 322 of lock tab 320 thereby further deflecting lock spring 300. Lock tab 320 engages and then disengages with retention recess 422 (See FIG. 5B). Shortly before module connector 502 mates with connector 147, media module housing 400 strikes eject spring 302 (See FIG. 5C). As module connector 504 mates with connector 147, eject spring 302 is loaded with mechanical energy. Lock tab 320 then engages locking recess 420, thus locking media module 500 in place within media bay 146. As media module housing 400 strikes eject spring 302, angled portion 312 of retainer tab 310 ensures that media module 500 is appropriately aligned along the Z-axis (where lock spring 300 and eject spring 302 are generally positioned along the X-axis and Y-axis, respectively). After module connector 502 and connector 146 mate, retainer tab 310 maintains the position of media module 500 along the Z-axis.

To remove media module 500 from media bay 146, release button 204 is actuated thus causing lock tab 320 to disengage locking recess 420. When lock tab 320 is disengaged, the action of eject spring 302 provides a force which is greater than the friction exerted between the pins of connector 146 and connector 502, thus causing connectors 146, 502 to decouple. Media module 500 ejects to the point where lock tab 320 engages retention recess 422 (See FIG. 5B) By engaging retention recess 422, the media eject system provides an anti-dropout feature. When lock tab 320 engages retention recess 422, media module 500 has been ejected from media bay 146 to a point where a user can easily grasp media module 500 and remove media module 500 from media bay 146.

OTHER EMBODIMENTS

Other embodiments are within the following claims.

For example, while a specific implementation of a computer system is disclosed, it will be appreciated that a media eject mechanism in accordance with the present invention will be applicable to any computer system configuration.

Also, for example, while beam springs are disclosed, it will be appreciated that other types of mechanical energy storage mechanisms such as pneumatic or bladder mechanisms are within the scope of the invention.

Also, for example, while the preferred embodiment includes mounting portion 304, it will be appreciated that lock spring 300 and eject spring 302 could be mounted directly to system board 200 or any other stationary portion of computer 100.

What is claim is:

1. An eject system for ejecting a member from a system, the eject system comprising:
   an eject mechanism including:
      an eject spring having an action, the eject spring being coupled to a chassis of the system, and
      a lock spring having an action, the lock spring being formed as a single piece with the eject spring and being coupled to the chassis, the lock spring including a lock tab extending therefrom, the action of the eject spring being generally perpendicular to the action of the lock spring; and
   a housing defining a locking recess;
   wherein the lock tab mates with the locking recess when the housing is inserted within a bay defined by the chassis.

2. The eject system of claim 1 wherein the eject spring and the lock spring eject member are mounted directly to the chassis.

3. The eject system of claim 1 wherein the eject spring and the lock spring are mounted to a system board, and the system board is coupled to the chassis.

4. The eject system of claim 1 wherein the eject mechanism further includes a mount portion having a connection portion coupling the mount portion to a stationary part of the system, wherein the eject spring and the lock spring are coupled to the mount portion.

5. The eject system of claim 4 wherein the stationary part of the system is the chassis.

6. The eject system of claim 4 wherein the stationary part of the system is a system board.

7. The eject system of claim 1 wherein
   the lock spring includes a leading edge portion, the leading edge portion being angled away from the action of the lock spring.

8. The eject system of claim 1 wherein the lock tab includes an angled leading edge.

9. The eject system of claim 1, wherein the eject system is an L-shaped member.

10. The eject system of claim 1, wherein the eject spring and the lock spring are leaf springs.

11. An eject system for ejecting a member from a system, the eject system comprising:
    an eject mechanism including:
       an eject spring having an action, the eject spring being coupled to a chassis of the system, and
       a lock spring having an action, the lock spring being coupled to the chassis, the lock spring including a lock tab extending therefrom, the action of the eject spring being generally perpendicular to the action of the lock spring; and
    a housing defining a locking recess and a retention recess, the retention recess including an angled side;
    wherein the lock tab mates with the locking recess when the housing is inserted within a bay defined by the chassis and wherein the lock tab mates with the retention recess when the housing is partially inserted within the bay.

12. A computer system comprising:
    a chassis defining a bay;
    a system board coupled to the chassis, the system board including a processor coupled to memory via a bus;
    a connector coupled to the bus; and
    a media eject mechanism including;
       an eject spring having an action, the eject spring being coupled to the chassis, and
       a lock spring having an action, the lock spring being formed as a single piece with the eject spring and coupled to the chassis, the lock spring including a lock tab extending therefrom, the action of the eject spring being generally perpendicular to the action of the lock spring;
    wherein the lock tab mates with a locking recess of a housing when the housing is inserted within the bay.

13. The computer system of claim 12 wherein the eject spring and the lock spring are mounted directly to the chassis.

14. The computer system of claim 12 wherein the eject spring and the lock spring are mounted to the system board, and the system board is coupled to the chassis.

15. The computer system of claim 12 wherein the eject mechanism further includes a mount portion having a connection portion coupling the mount portion to a stationary part of the system, the eject spring being coupled to the mount portion, and the lock spring being coupled to the mount portion.

16. The computer system of claim 15 wherein the stationary part of the system is the chassis.

17. The computer system of claim 15 wherein the stationary part of the system is a system board.

18. The computer system of claim 12 wherein
    the lock spring includes a leading edge portion, the leading edge portion being angled away from the action of the lock spring.

19. The computer system of claim 12 wherein
    the lock tab includes an angled leading edge.

20. An eject system for ejecting a member from a system, the eject system comprising:
    an eject mechanism including:
       an eject spring having an action, the eject spring being coupled to a chassis of the system;
       a lock spring having an action, the lock spring being coupled to the chassis, the lock spring including a lock tab extending therefrom, the action of the eject spring being generally perpendicular to the action of the lock spring;
       a mount portion having a connection portion coupling the mount portion to a stationary part of the system, wherein the eject spring and the lock spring are coupled to the mount portion; and
       a retainer tab coupled to the mount portion, the retainer tab extending generally perpendicularly from the mount portion; and
    a housing defining a locking recess;
    wherein the lock tab mates with the locking recess when the housing is inserted within a bay defined by the chassis.

21. The eject system of claim 7 wherein the retainer tab includes an angled portion, the angled portion being angled away from the mount portion.

22. An eject mechanism for ejecting a member from a system, the eject mechanism comprising:
    an eject spring having an action, the eject spring being coupled to a chassis of the system, and a lock spring having an action, the lock spring being formed as a single piece with the eject spring and coupled to the chassis, the lock spring including a lock tab extending therefrom, the action of the eject spring being generally perpendicular to the action of the spring;

wherein the lock tab mates with a locking recess of a housing when the housing is inserted within a bay defined by the chassis.

23. The eject mechanism of claim 22 further comprising a mount portion having a connection portion, the connection portion coupling the mount portion to a stationary part of the system, the eject spring being coupled to the mount portion, and the lock spring being coupled to the mount portion.

24. The eject system of claim 22 wherein the lock tab includes an angled leading edge.

25. A computer system comprising:

a chassis defining a bay;

a system board coupled to the chassis, the system board including a processor coupled to memory via a bus;

a connector coupled to the bus; and a media eject mechanism including:
   an eject spring having an action, the eject spring being coupled to the chassis;
   a lock spring having an action, the lock spring being coupled to the chassis, the lock spring including a lock tab extending therefrom, the action of the eject spring being generally perpendicular to the action of the lock spring;
   a mount portion having a connection portion coupling the mount portion to a stationary part of the system, wherein the eject spring and the lock spring are coupled to the mount portion; and
   a retainer tab coupled to the mount portion, the retainer tab extending generally perpendicularly from the mount portion;
   wherein the lock tab mates with a locking recess of a housing when the housing is inserted within the bay.

26. The computer system of claim 25 wherein the retainer tab includes an angled portion, the angled portion being angled away from the mount portion.

27. An eject mechanism for ejecting a member from a system, the eject mechanism comprising:

an eject spring having an action, the eject spring being coupled to a chassis of the system;

a lock spring having an action, the lock spring being coupled to the chassis, the lock spring including a lock tab extending therefrom, the action of the eject spring being generally perpendicular to the action of the lock spring;

a mount portion having a connection portion coupling the mount portion to a stationary part of the system, wherein the eject spring and the lock spring are coupled to the mount portion; and a retainer tab coupled to the mount portion, the retainer tab extending generally perpendicularly from the mount portion;

wherein the lock tab mates with a locking recess of a housing when the housing is inserted within a bay defined by the chassis.

28. The eject mechanism of claim 27 wherein the retainer tab includes an angled portion, the angled portion being angled away from the mount portion.

29. The eject mechanism of claim 28 wherein the lock spring includes a leading edge portion, the leading edge portion being angled away from the action of the lock spring.

* * * * *